United States Patent [19]

Swain et al.

[11] 4,240,908
[45] Dec. 23, 1980

[54] COATED METAL FIBER COALESCING CELL

[75] Inventors: Robert J. Swain, Tulsa; William D. Rutz, Sapulpa, both of Okla.

[73] Assignee: Mapco, Inc., Tulsa, Okla.

[21] Appl. No.: 822,363

[22] Filed: Aug. 5, 1977

Related U.S. Application Data

[63] Continuation of Ser. No. 708,599, Jul. 26, 1976, abandoned.

[51] Int. Cl.³ ............... B01D 17/02; B01D 29/32
[52] U.S. Cl. ........................ 252/325; 210/491; 210/497.1; 210/508; 210/DIG. 5; 210/799; 210/708; 156/191
[58] Field of Search ........ 55/525; 210/23 R, 488–492, 210/497 R, 502, 506, 508, 510, DIG. 5

[56] References Cited

U.S. PATENT DOCUMENTS

| | | | |
|---|---|---|---|
| 2,404,872 | 7/1946 | Walker, Jr. | 210/23 R |
| 3,199,676 | 8/1965 | May | 210/DIG. 5 |
| 3,256,988 | 6/1966 | Lanier et al. | 210/DIG. 5 |
| 3,405,058 | 10/1968 | Miller | 210/506 X |
| 3,592,767 | 7/1971 | Pall | 210/490 |
| 3,645,398 | 2/1972 | Fiocco | 210/DIG. 5 |
| 3,876,544 | 4/1975 | Fowler | 210/DIG. 5 |
| 3,931,019 | 1/1976 | Fowler | 210/DIG. 5 |

*Primary Examiner*—Robert H. Spitzer
*Attorney, Agent, or Firm*—Head & Johnson

[57] ABSTRACT

A cell for coalescing oil droplets dispersed in a water emulsion including an elongated perforated tube core into which the emulsion is injected, layers of oleophilic plastic covered metal mat wound about the core through which the emulsion is forced to pass, the fibers of the metal mat being covered by oleophilic plastic such as vinyl, acrylic, polypropylene, polyethylene, polyvinyl chloride, the metal being in the form of layers of expanded metal or metal fibers, either aluminum or stainless steel. In manufacturing the cell a helix wound wire is formed around the cylindrical plastic coated metal to retain it in place and resist pressure drop of fluid flowing through the metal fibers. In addition, the preferred arrangement includes the use of an outer sleeve formed of a mat of fibrous material such as polyester fibers, acrylic fibers, modacrylic fibers and mixtures thereof.

11 Claims, 9 Drawing Figures

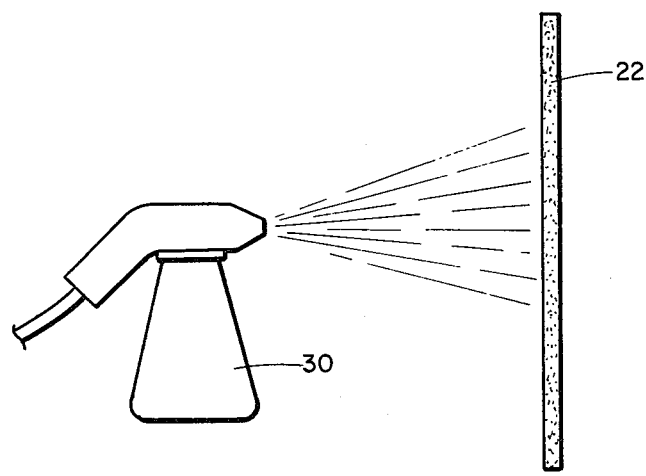
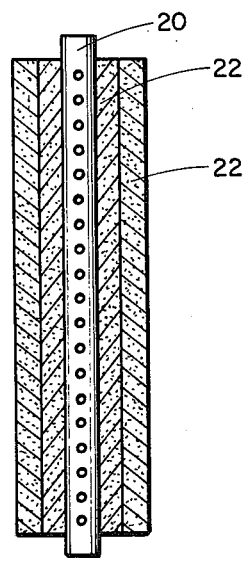
Fig. 5              Fig. 6
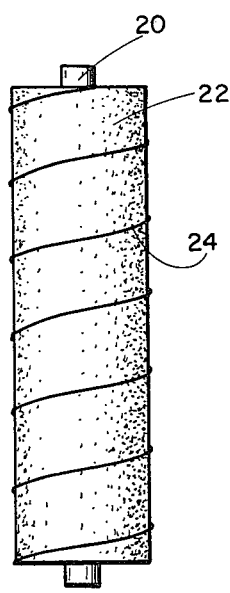 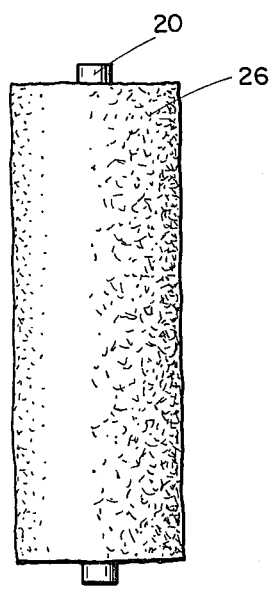 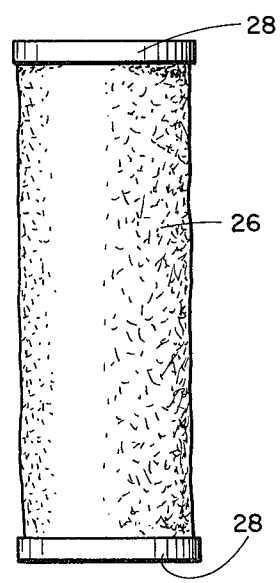
Fig. 7        Fig. 8        Fig. 9

COATED METAL FIBER COALESCING CELL

This is a continuation of application Ser. No. 708,599, filed July 26, 1976, now abandoned.

BACKGROUND AND OBJECTS OF THE INVENTION

A problem commonly encountered in industry is that of separating oil and water which have become emulsified. A known method of achieving separation is by the use of coalescence, that is, flowing the emulsion through a medium arranged in such a way that the oil droplets tend to adhere to a coalescing material and then to each other, the droplets accumulating in size until they form globules which float to the surface of the water emulsion. Once the emulsion is broken by the formation of the oil droplets and globules the oil can be skimmed off the surface of the emulsion for removal and the water from the emulsion can be removed from the lower portion of the vessel in which the emulsion is being treated.

One problem which has existed with cells for coalescing oil dispersed in a water emulsion is that the fine mat material which is customarily utilized as the coalescing medium becomes clogged with solid particles in a relatively short time. Most emulsions arise from industrial processes which also produce solid contaminants. When an attempt is made to coalesce the oil from the emulsion the coalescing cells function as filters and soon the porous passageways become filled with the solid contaminants.

The present invention is directed towards a coalescing cell which is characterized by improved porosity while maintaining coalescing effectiveness so as to permit the passage of larger particles without becoming clogged as compared with other known types of coalescing cells.

Another object of the invention is to provide an improved type of coalescing cell which employs a coalescing medium higher in structural strength and therefore able to resist more pressure drop than is characteristic of other types of coalescing cells known today.

Another object of the present invention is to provide a coalescing cell formed of layers of metal mat treated in a way to enhance oleophilic action.

Another object is to provide a method of manufacturing a cell for coalescing oil in a water emulsion utilizing a metal mat as a base material.

These general objects as well as other and more specific objects of the invention will be fulfilled in the following description and claims, taken in conjunction with the attached drawings.

DESCRIPTION OF VIEWS

FIGS. 5 through 9 show the sequence of steps and the method of manufacturing the coalescing cell of this invention.

FIG. 5 shows the step of spraying a mat of metal fibers with an oleophilic plastic.

FIG. 6 shows the mat of plastic coated metal fibers wound about a central perforated tube. FIG. 7 shows the cylindrically formed metal mat about the perforated center tube having a helically wound wire thereon to retain the metal mat in position about the tube.

FIG. 8 shows an envelope formed of a mat of plastic material encompassing the plastic coated metal fibers.

FIG. 9 shows the end caps which have been applied to the ends of the central tube and the spiraled wound metal fibers as the cell appears in completed form.

SUMMARY OF THE INVENTION

A coalescing cell is formed by spraying sheets of metal fibers with an oleophilic plastic to essentially cover all surfaces of the metal fibers, the sprayed metal fibers are then wound about a central perforated tube and the metal fibers held in place about the tube in cylindrical configuration by means of a helically wound wire. End caps are then applied to the cylindrical wrapped metal fiber and an outer envelope of oleophilic plastic mat is applied. The completed cell has improved coalescing characteristics with increased porosity compared to existing types of coalescing cells and is better able to resist plugging by solid contaminants.

DETAILED DESCRIPTION

Figure 1:
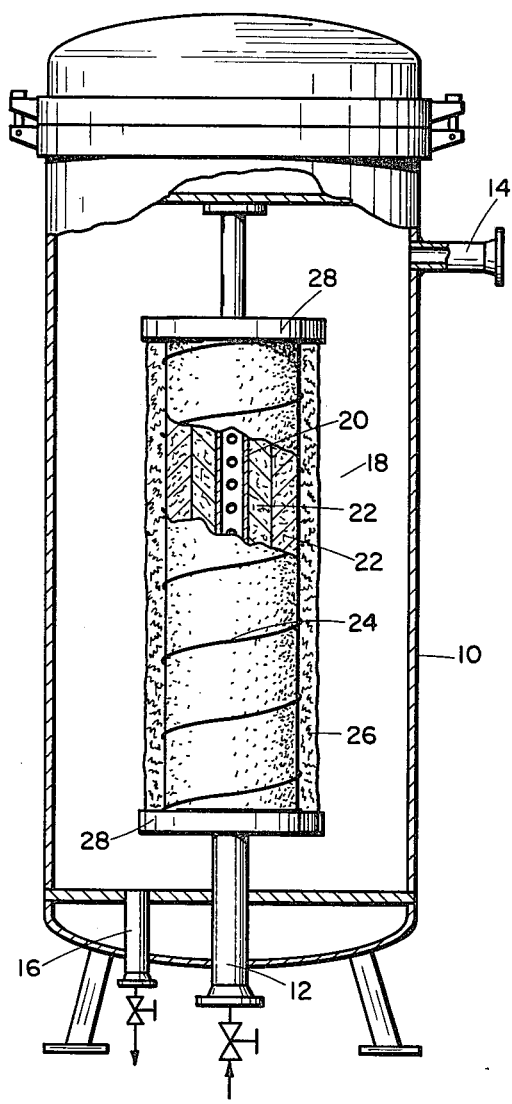
FIG. 1 is a cross-sectional view of a typical apparatus for separating oil and water from an emulsion showing in partial cross section the coalescing cell of this invention.
Figure 2:
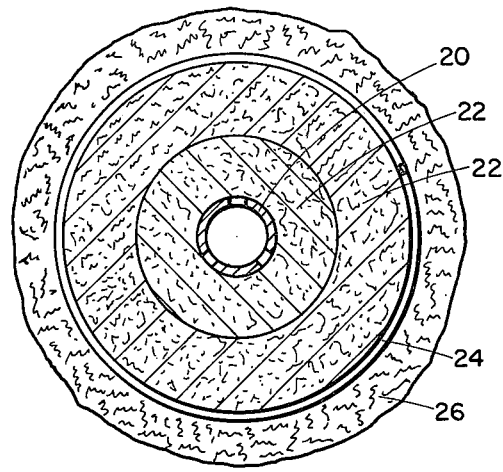
FIG. 2 is a cross-sectional view of the coalescing cell taken along the line 2—2 of FIG. 1.
Figure 3:
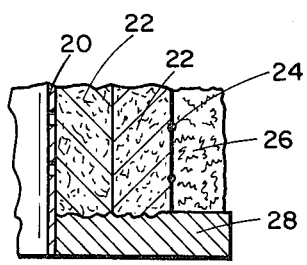
FIG. 3 is a partial cross-sectional view of a coalescing cell showing one means of affixing an end cap to the cell.

Referring to the drawings and first to FIG. 1 a typical apparatus for coalescing a water and oil emulsion is shown. The apparatus includes an upright vessel 10 having an emulsion inlet 12, an oil outlet 14 and a water outlet 16. In the vessel is a coalescing cell generally indicated by the numeral 18 which is the subject of this invention. The cell, shown in cross-section in FIG. 2, includes a central perforated tube 20 and at least one but preferably a plurality of layers of plastic coated metal mat 22. The layers of metal mat wound around the central perforated tube 22 provide a cylindrical configuration. To retain the mat windings 22 in position, a length of wire 24 is helically wound around the external cylindrical surface. Positioned over the metal mat contained in place by wire 22 is an envelope 26 formed of oleophilic plastic fibers. The cylindrical cell is closed at each end by end caps 28, the lower end cap having an opening therein which receives central tube 20 and permits the flow of the emulsion into the interior of the central tube.

Emulsion flows into vessel 10 through the inlets 12 and into the interior of the central perforated tube 20. It then flows radially outwardly through the cell and through the layers of plastic coated metal fibers 22. The coating on the metal fibers is of a material which attracts oil and repels water, commonly referred to as "oleophilic". The multitude of fibers forming layers 22 causes the oil to accumulate in droplets and the droplets accumulate on the outer surface of the cell into globules which rise to the surface of the emulsion in the interior of the vessel 10. Water, being heavier falls to the lower portion of the vessel and is removed through outlet 16.

FIGS. 5 through 9 show the sequence of steps employed in constructing a coalescing cell. First, a sheet or bat of fibrous metal 22 is covered with a coating of oleophilic plastic material. This coating can be formed such as of vinyl, epoxy, acrylic, polypropylene, polyethylene, polyvinyl chloride, Teflon or phenolic resin. The coating may be applied as shown in FIG. 5 utilizing a spray gun 30 direct the plastic coating in liquid form onto the metal fiber. The sheet of metal fiber 20 is preferably sprayed from both sides so as to ensure that substantially all of the external surfaces of the strands or fibers are covered with the oleophilic plastic material. Another means, not illustrated, includes dipping the mat of metal material into liquid plastic, allowing the excess to drain off and the material dried or solidified onto the surfaces of the metal fibers. Any method of covering the metal fibers with the oleophilic plastic would be within the purview of this invention. The oleophilic plastic should cover substantially all the fibers making up mat 22 to a thickness of about 0.001 to 0.004 inches.

The metal mats 22 may be of any type of metallic material arranged to provide porous fibers or strands. Examples include the use of layers of expanded metal or the use of woven or nonwoven metal fibers or metal shavings. Aluminum or stainless steel are the preferred metals. When the coalescing cell is to be utilized with a fresh water emulsion the metal fibers may be of aluminum whereas if the emulsion is of salt water or is otherwise corrosive to aluminum, stainless steel metal fibers are used.

After the metal fibers have been sprayed with the oleophilic plastic material they are wrapped about the central perforated tube 20 as shown in FIG. 6. Subsequently, the cylinder of plastic coated fibrous material is helically wound with a wire 24 as shown in FIG. 7. The wire 24 serves to retain the metal fibers in position about the central tube 20 and to resist bursting force caused by pressure drop of fluid flowing from the interior to the exterior of the cell. Wire 24 may be of stainless steel and of a diameter about 0.032 inches. The spacing between the helically formed wire may typically beĸ" to 2 inches, the spacing being predicated primarily upon the pressure drop which the cell is designed to resist. The wire is wound on the cylindrically formed metal mesh utilizing sufficient tension to slightly compact the metal mesh but not of such tension as to significantly decrease the porosity of the material.

After the metal mat is wound about core 20 and retained in place by wire 24 end caps 28 are applied. The end caps may take a variety of forms. A typical construction includes the use of end caps of high temperature epoxy plastic. They may be applied to the ends of the cell by heating the surfaces of the plastic to the molten state and the end caps then are pressed against the ends of the cell and allowed to cool so they are retained in place. In another arrangement the surfaces of the end caps are softened with solvent and then pressed against the ends of the cells. A third arrangement includes the use of metal such as lead, the surface of which is raised to molten temperature and placed against the ends of the cell. Any arrangement which provides a leakproof contact of the end caps with the ends of the wound cell is satisfactory, the function of the end caps being to ensure the rigid structure support of the cell and to prevent leakage of fluid flowing from the interior of the perforated tube to the exterior of the cell except by passage through fibrous mat 22.

The final step in the construction of the coalescing cell is the encapsulation of the cell by a wrap of a bat of oleophilic material, such as glass fibers, polyester fibers, acrylic fibers, modacrylic fibers and mixtures thereof. The function of the outer envelope of a mat of plastic fibers is to provide a final area of coalescence of the oil droplets moving outwardly by the stream flow through the coalescing cell so as to permit their accumulating into globules of sufficient size to ensure that they will rise to the surface of the liquid within the vessel 10.

End caps 28 may be affixed to the cell before or after the envelope of plastic mat 26 is applied. The layers of metal fibers 22 are preferably formed on perforated center tube 20 to a thickness of at least ½". The thickness of the plastic envelope is also preferably at least ½".

Figure 4:
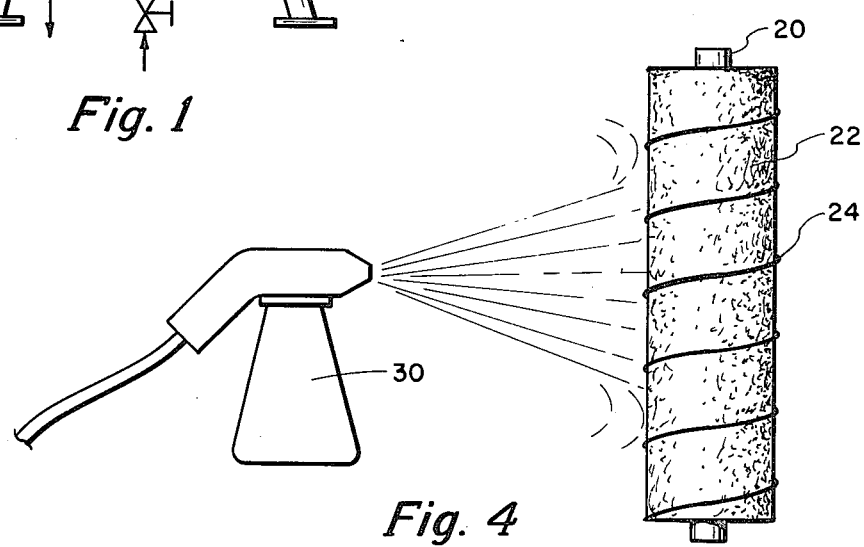
FIG. 4 is a diagrammatic illustration of a means of applying oleophilic plastic coating to a metal mat as used in the construction of the coalescing cell.

As shown in FIG. 4, after the coated metal mat 22 is wound about the center tube and wire 24 applied to hold it in place a supplementary coating of oleophilic plastic may be applied by a spray gun 30 before the envelope of plastic matting is affixed. This supplemental spraying step is not mandatory and is utilized only if it is desired to provide extra oleophilic plastic material to the basic portion of the cell, including wires 24, for increased effectiveness of coalescence.

While the coalescing cell of this invention has been described with a certain degree of particularity it is manifest that many changes may be made in the details of construction and the arrangement of components without departing from the spirit and scope of this disclosure. It is understood that the invention is not limited to the embodiments set forth herein for purposes of exemplification but is to be limited only by the scope of the attached claim or claims, including the full range of equivalency to which each element thereof is entitled.

What is claimed:

1. A method of separating oil and water dispersed in an emulsion comprising the steps of:
    coating a mat of metal fibers with a layer of oleophilic material selected from a class consisting of vinyl, epoxy, acrylic, polyprophylene, polyethylene, polyvinyl chloride, Teflon and phenolic resin;
    flowing the emulsion through a plurality of layers of the plastic covered mat of metal fibers in a water environment, whereby oil is coalesced and floats towards the top of the water environment; and
    withdrawing the coalesced oil from the upper portion of the water environment.

2. The method of claim 1 including the steps of:
    winding a plurality of layers of the fibrous metal mat about an elongated perforated tube; and
    flowing the emulsion into the perforated tube and out through the fibrous metal mat.

3. The method of claim 1 wherein the step of coating a fibrous metal mat includes coating said mat with said oleophilic plastic to a thickness of at least 0.001 to 0.004 inches.

4. The method of claim 1 including the step of:
    encompassing said layers of plastic covered fibrous metal mat with an outer layer formed of a bat of fibers selected from the class consisting of glass fibers, polyester fibers, acrylic fibers, molacrylic fibers and mixtures thereof, the emulsion and coalesced oil droplets flowing through the outer layer.

5. A cell for coalescing oil droplets dispersed in a water emulsion, comprising:
    an elongated perforated tube core into which the emulsion is injected;
    a plurality of layers of a mat of metal fibers wound about and contiguous with said core through which the emulsion is forced to pass, the mat being formed of fibrous metal coated with a layer of oleophilic material selected from the class consisting of vinyl, epoxy, acrylic, polypropylene, polyethylene, polyvinyl, chloride, Teflon and phenolic resin, the plurality of layers of the coated metal mat providing a multi-layer cylindrical configuration; and impervious end caps affixed to the ends of the cylindrically formed coated metal mat wound about the perforated tube, one of the end caps having an opening communicating with the interior of said center tube.

6. A cell for coalescing oil droplets dispersed in a water emulsion according to claim 5 including a length of wire wound helically on the outer surface of said metal mat wound about said core.

7. A cell for coalescing oil droplets dispersed in a water emulsion according to claim 5 including an outer layer encompassing said layer of oleophilic covered metal mat, the outer layer being formed of a bat of fibers selected from the class consisting of glass fibers, polyester fibers, acrylic fibers, modacrylic fibers and mixtures.

8. A cell for coalescing oil droplets dispersed in a water emulsion according to claim 5 wherein said metal mat is of aluminum.

9. A cell for coalescing oil droplets dispersed in a water emulsion according to claim 5 wherein said metal mat is of stainless steel.

10. A method of constructing a cell for coalescing oil droplets dispersed in a water emulsion comprising:

spraying a mat formed of metal fibers with oleophilic plastic to cover substantially all surface areas of the fibers forming the metal mat to a thickness of at least about 1 to 4 thousandth inch, the oleophilic plastic being selected from the class consisting of vinyl, epoxy, acrylic, polypropylene, polyethylene, polyvinyl chloride, Teflon and phenolic resin;

winding a plurality of layers of the sprayed metal mat about an elongated perforated tube to provide a multilayer cylindrical configuraton; and affixing impervious end caps to the ends of the cylindrically formed coated metal mat wound about the perforated tube.

11. A method of constructing a cell for coalescing oil droplets dispersed in a water emulsion according to claim 10 includes the step of:

positioning a sleeve about the wire wound cylindrical metal mat, the sleeve being formed of a mat of fibers selected from the class consisting of glass fibers, polyester fibers, acrylic fibers, modacrylic fibers and mixtures of such fibers.

* * * * *